(12) United States Patent
Parker

(10) Patent No.: US 6,536,717 B2
(45) Date of Patent: Mar. 25, 2003

(54) SINGLE POST SUPPORT

(76) Inventor: Philip A. Parker, Rte. 2 Box 2264, Naples, TX (US) 75568

( * ) Notice: Subject to any disclaimer, the term of this patent is extended or adjusted under 35 U.S.C. 154(b) by 0 days.

(21) Appl. No.: 09/908,161

(22) Filed: Jul. 19, 2001

(65) Prior Publication Data

US 2002/0011548 A1 Jan. 31, 2002

Related U.S. Application Data

(60) Provisional application No. 60/221,269, filed on Jul. 27, 2000.

(51) Int. Cl.$^7$ .................................................. F16L 3/00
(52) U.S. Cl. ........................ 248/49; 248/70; 248/74.4; 248/346.01
(58) Field of Search ........................ 248/346.01, 188.1, 248/188.4, 49, 74.1, 74.4, 354.1, 354.3, 70

(56) References Cited

U.S. PATENT DOCUMENTS

| | | | | |
|---|---|---|---|---|
| 492,593 | A | * | 2/1893 | Taylor ........................ 248/74.4 |
| 675,104 | A | * | 5/1901 | Oberle |
| 675,106 | A | * | 5/1901 | Oberle |
| 1,522,684 | A | | 1/1925 | Howard |
| 1,910,293 | A | | 5/1933 | Jung |
| 2,248,369 | A | | 7/1941 | Ludersen |
| 2,395,156 | A | * | 2/1946 | Wick ........................... 248/633 |
| 3,027,140 | A | * | 3/1962 | Holzbach ............. 248/354.3 X |
| 3,398,933 | A | | 8/1968 | Haroldson |
| 3,530,899 | A | * | 9/1970 | Breeding ..................... 138/107 |
| 3,809,348 | A | * | 5/1974 | Di Laura |
| 4,020,531 | A | * | 5/1977 | Aherens et al. |
| 4,066,234 | A | * | 1/1978 | Nycum ........................ 248/558 |
| 4,445,656 | A | * | 5/1984 | Leitch et al. |
| 4,502,653 | A | | 3/1985 | Curtis, Jr. ..................... 248/55 |
| 4,513,934 | A | | 4/1985 | Pruyne ......................... 248/49 |
| 4,530,478 | A | * | 7/1985 | McClellan .................... 248/62 |
| 4,581,863 | A | * | 4/1986 | Thaler ........................ 52/126.2 |
| 4,870,789 | A | * | 10/1989 | Clark et al. ................. 52/126.6 |
| 5,028,149 | A | | 7/1991 | Hardtke |
| 5,102,073 | A | | 4/1992 | Lestenkof, Jr. ............... 248/49 |
| 5,217,191 | A | | 6/1993 | Smith |
| 5,335,887 | A | | 8/1994 | Torrens et al. |
| 5,590,494 | A | * | 1/1997 | Miller |
| 5,685,508 | A | | 11/1997 | Smith |
| 5,816,554 | A | | 10/1998 | McCracken |
| 5,829,718 | A | | 11/1998 | Smith |
| 5,890,696 | A | * | 4/1999 | Ozawa |
| 5,906,341 | A | * | 5/1999 | Brown |
| 6,017,005 | A | | 1/2000 | Smith |
| 6,076,778 | A | * | 6/2000 | Brown |
| 6,206,613 | B1 | * | 3/2001 | Elkins |
| 6,324,800 | B1 | * | 12/2001 | Valentz et al. |

* cited by examiner

Primary Examiner—Anita King
(74) Attorney, Agent, or Firm—Slater & Matsil, L.L.P.

(57) ABSTRACT

A single post adjustable support device to provide interval support to a drain piping system where the piping is required to be suspended above a roof surface at continually changing elevations due to the need to have the piping system maintain a continual and gradual slope, compensating for un-regular surface conditions of the roof surface.

8 Claims, 5 Drawing Sheets

SINGLE POST SUPPORT

CROSS-REFERENCE TO RELATED APPLICATIONS

This application is entitled to the benefit of Provisional Patent Application Ser. No. 60/221,269, filed Jul. 27, 2000.

BACKGROUND

1. Field of Invention

This Invention is in the field of mechanical piping supports.

2. Background of the Invention

In the field of plumbing, it is common to install the condensate drains from roof mounted air conditioning equipment across the surface of the roof. These drains should have a gradual and even slope to permit the condensate from the equipment to discharge into a drain receptacle. These receptacles can be an open roof drain receiver, a vent pipe opening or a penetration through the roof to a sanitary drain receptacle.

Other improvised discharges often occur during installation of the condensate drain piping system. However, in all cases it is usually considered critical that the piping maintain a slope. To maintain a consistent slope to the pipe it is necessary to provide supports at certain intervals along the piping run.

To accomplish this slope of the pipe system, the installer has typically used several treated wooden boards stacked atop one another. Using this stacking technique, the installed is able to achieve the desired slope by limiting the number of boards required at each support interval to that number that will result in a proper slope. A pipe strap would normally secure the piping to the blocks.

Unfortunately, this technique makes no compensation for slope to the roof surface. In other words, if there exists a slope in the roof surface then reducing the number of boards to be stacked atop one another at intervals might either overcompensate for the roof slope providing excessive slope to the piping or in reverse provide either no slope or even counter slope. In any case this technique has been found to be less than acceptable.

Recently, the idea to stack manufactured pipe supports atop one another was considered a more practical alternative to the blocks of wood. Though more appealing than cut lumber, these products had several similar disadvantages. Miro Industries manufactures such a support product. First, the problem concerning roof slope is not resolved by substituting a manufactured product for a block of wood.

Secondly, with wood, each piece could be secured together by nailing each block together. With most support products, this is not practical since the product is typically made of plastic. Having each piece of support freestanding atop the next, the elevating support structure can become unstable and tip over.

Also devised has been a method to utilize a single block of wood with a threaded flange piece secured atop. A threaded rod was affixed to this flange an extended upwards with a pipe clamp at the end. Each threaded rod would be cut at the desired length to accomplish the necessary slope for the piping system.

Even more recently, a product has been developed that utilizes a round plastic base wherein a section of plastic tubing is inserted vertically thus giving an elevated structure where a clamping type apparatus is positioned atop the elevated pipe. The condensate drain piping is then placed within this apparatus, thus providing the need supports for the drain system.

Lastly, this inventor had devised a plastic base with a threaded insert where in a threaded rod could be affixed. This rod would provide an elevated support structure where a pipe clamp could then be utilized to secure and support this drain piping.

With each of these described methods to provide interval support to the condensate drain system, there continued to be a primary flaw. That is to say that in each case, once either the affixed threaded rod or plastic tubing had been cut to the correct size to insure correct slope in the piping system, there remained no leeway for human error. In other words, if the installer failed to calculate the correct length of either rod or tubing prior to installation of the support device, then it would become necessary to re-cut either the present piece, or cut another in the case where the first was determined to be too short.

Not only has this described problem plague these types of supports, but also to be considered is the need to cut in the field and during installation, each adjustment rod or tubing.

Having devoted time and effort devoted to finding to a solution to the need to improve upon the original concept of utilizing blocks to elevated this type of drain piping, this inventor believes that a more practical way to accomplish the desired support and need to maintain a consistent slope was in order.

A support device intended for use to support a drain pipe system across a seemly flat roof should be forgiving when compensating for last minute slope adjustments. It should be versatile in regards to varied height adjustments achievable for the support. It should have a means to secure the piping while providing a secure, not easily dislodges base that resets comfortably upon the roof surface.

SUMMARY

The invention is a single post support device to provide interval support to a drain piping system where the piping is required to be suspended above a roof surface at continually changing elevations due to the need to have the piping system maintain a continual and gradual slope, compensating for un-regular surface conditions of the roof surface.

OBJECTS AND ADVANTAGES

Accordingly, several objects and advantages of my invention are:

A: The telescoping adjustment rod feature permits the installer of the piping system to use a common model having a common length of the adjustment rod of the support along the piping system while allowing each support to be field adjusted to the required elevation.

B. The properties of the base materials assure longevity when exposed to effects of the weather.

C. The stainless rod and pipe clamp construction prevents weathering of the support structure.

D. The neoprene pad adds protection to the roof surface.

E. The rubber cushion at the clamp provides both vibration isolation as well as separation of dissimilar materials in cases where the condensate piping is made of copper tubing.

LIST OF REFERENCE NUMERALS

1. Support Base
2. Reinforcing Ridge
3. Reinforcing Flange
4. Round Cone
5. Threaded Nut
6. Groove
7. Pipe Clamp
8. Clamp Upper Portion
9. Clamp Lower Portion
10. Threaded Collar
11. Threaded Screws
12. Threaded Adjustment Rod
13. Cushion Pad
14. Piping
15. Insertion Cavity

DESCRIPTION OF THE INVENTION

The invented Single Post Support is a free standing support assembly to secure piping above and along a flat roof. It has a flat bottom surface that permits the base to rest comfortably on the roof. It has a clamp to secure the piping and a threaded rod for height adjustments.

The base for the support is molded from plastic having a flattened bottom surface and a hollow cylinder shaped insertion cavity. When incorporated into a conventional adjustable pipe support assembly, the base will provide an economical and easily adjusted means of placing and supporting piping over a flat roof. The base has molded plastic reinforcing ridges and flanges to provide added strength. A single cone rises from the top surface of the base. A threaded nut is affixed into a groove that is located at the top of the cone.

A threaded adjustment rod is easily turned into the support through the threaded nut. This rod can be of any length but it is practical to have it at a length that permits a telescoping affect when the rod is turned within the inserted threaded nut. This rod has a conventional pipe clamp affixed to one end. The clamp is two piece in design, made of steel, having an upper portion that fits over the pipe and a lower portion with a female threaded collar affixed to it. The pipe clamp is affixed to the threaded rod by turning the rod into the threads of the collar. An adhesive can be utilized to secure the clamp to the rod.

The upper and lower portions of the clamp are secured together with threaded screws. These screws pass through holes in either side of the upper section of the clamp and are tightened into threaded holes in the lower portion. This securing of the two portions of the clamp will secure piping to the support assembly.

DETAILED DESCRIPTION OF THE DRAWINGS

Figure 1:
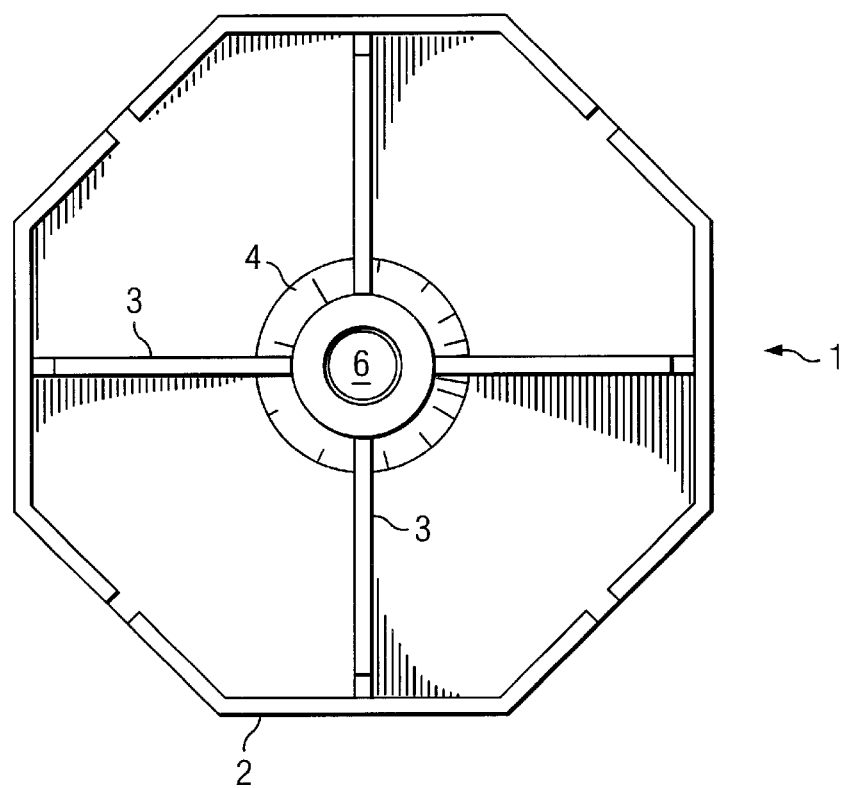
FIG. 1 is a top view of the support base having hexagonal shape.

FIG. 1 is a top view of support base 1. The base, made of an injection mold process, is hexagonal in shape. Reinforcing ridges 2 are along the perimeter of the base to provide added strength to the base. Round cone 4 extends upward from the upper surface of the base having reinforcing flanges 3 along four sides. The outline of groove 6 is visible from this top view.

Figure 2:
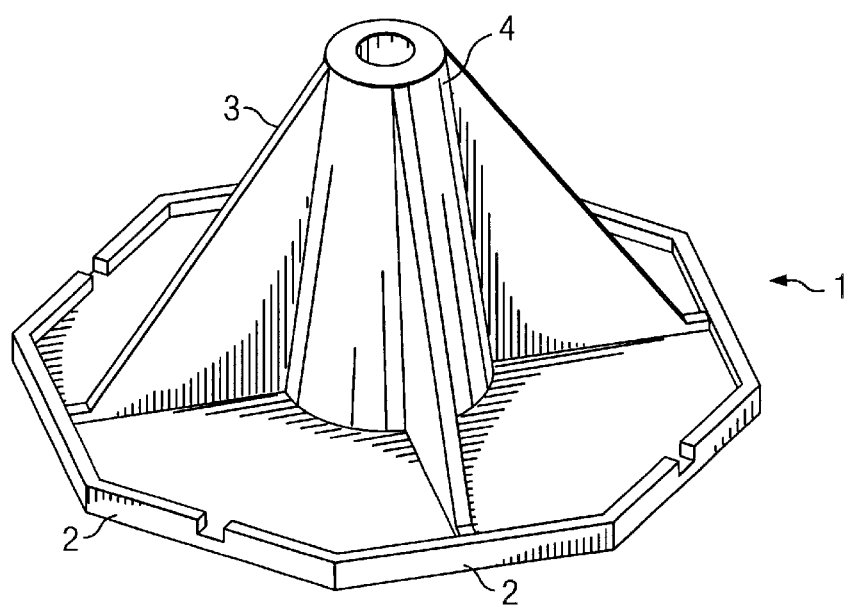
FIG. 2 is a side view of this same base.
Figures 2A, 3:
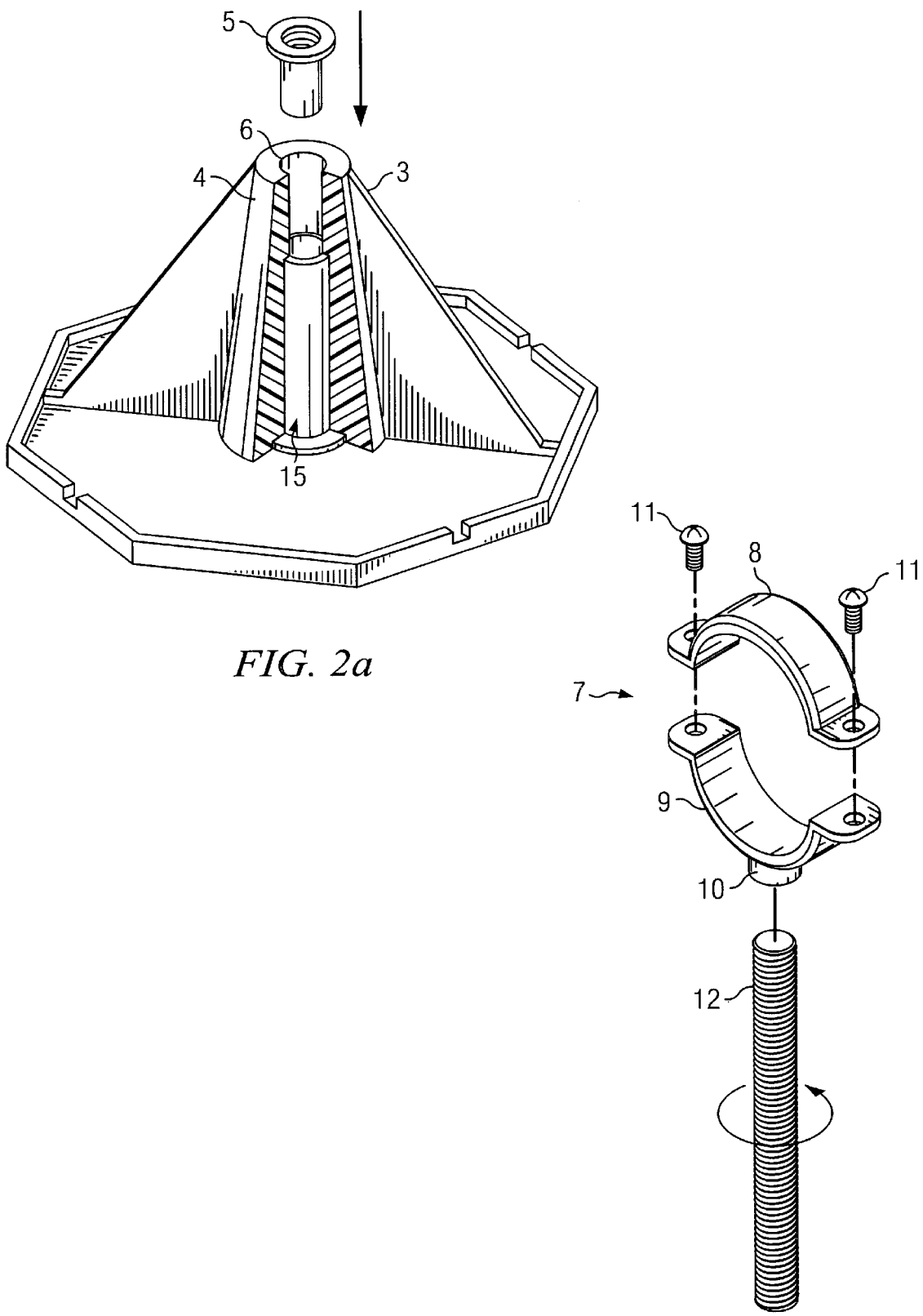
FIG. 2a is a sectional view of the base.
FIG. 3 is an isometric view of the pipe clamp with threaded rod.

Now viewing base 1 from the side in FIG. 2. Reinforcing flanges 3 are more clearly shown. The sectional view in FIG. 2a shows clearly grooves 6. It also demonstrates the insertion of threaded nut 5. The nut is affixed to the base with an adhesive. Insertion cavity 15 is shown also in this view.

The isometric view in FIG. 3 shows pipe clamp 7. Upper portion 8 is placed atop lower portion 9 and attached with threaded screws 11. Threaded collar 10 receives threaded adjustment rod 12. By turning this rod after applying a small quantity of an adhesive within the collar, the rod is affixed to the pipe clamp.

Figure 4:
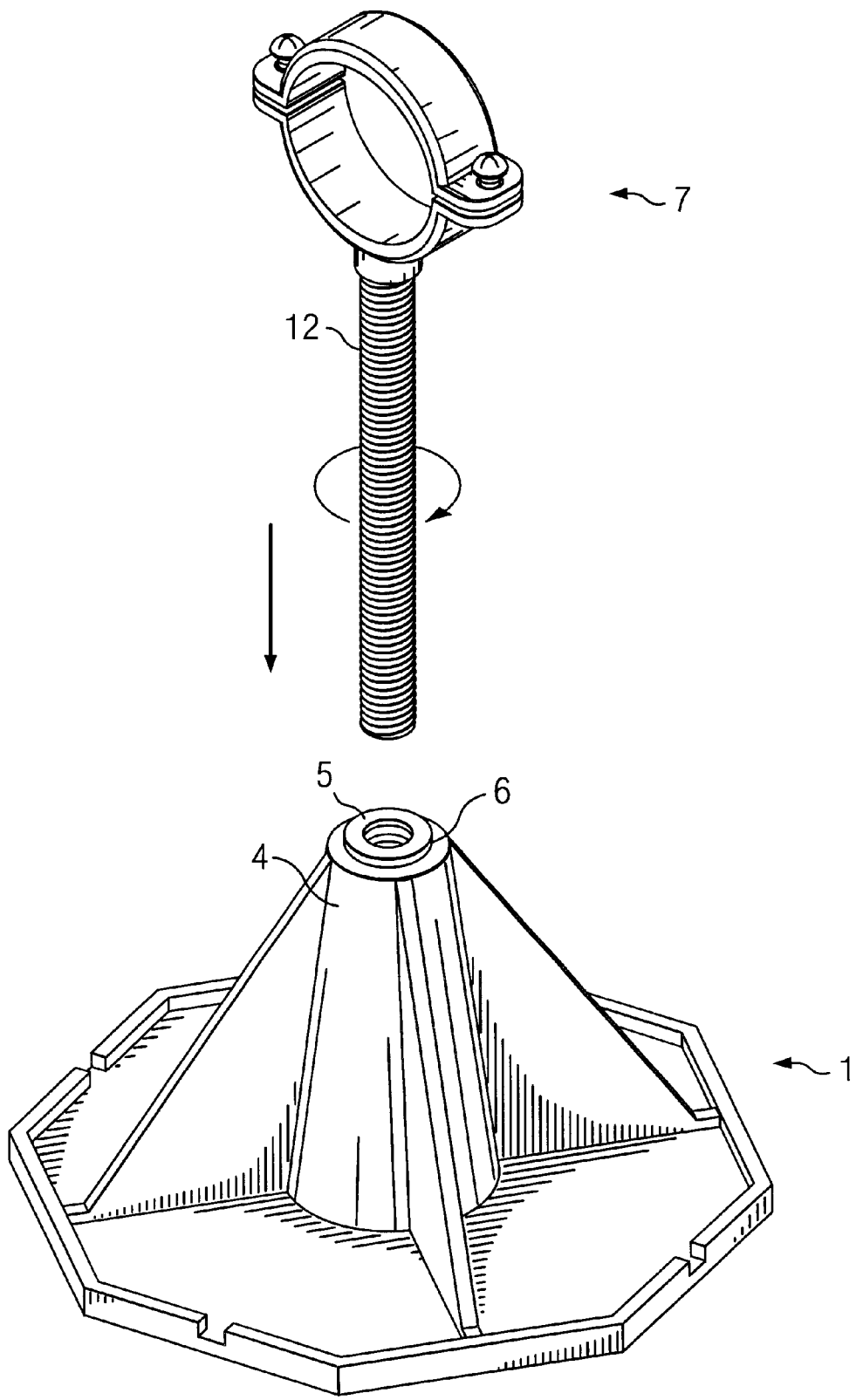
FIG. 4 is an isometric view of the Single Post assembly.

Now turning to FIG. 4, the isometric view of the components of the assembly is shown. Adjustment rod 12 with pipe clamp 7 is threaded into threaded nut 5 which has been adhered to base 1 in groove 6 atop cone 4.

OPERATION OF THE INVENTION

Vertical height adjustment of the pipe support assembly is accomplished in the following fashion. By holding the pipe clamp affixed to the threaded rod in one hand, and spinning or turning the base with the other, the pipe clamp is either elevated or lowered.

Also, the base can be held firmly in one hand while the rod with pipe clamp is turned. Either technique is acceptable for height adjustment. However, once piping is secured to the assembly, it becomes necessary to perform the first described technique of adjustment unless the installer elects to first un-secure the pipe from the clamp prior to commencement of any adjustment.

Figure 5:
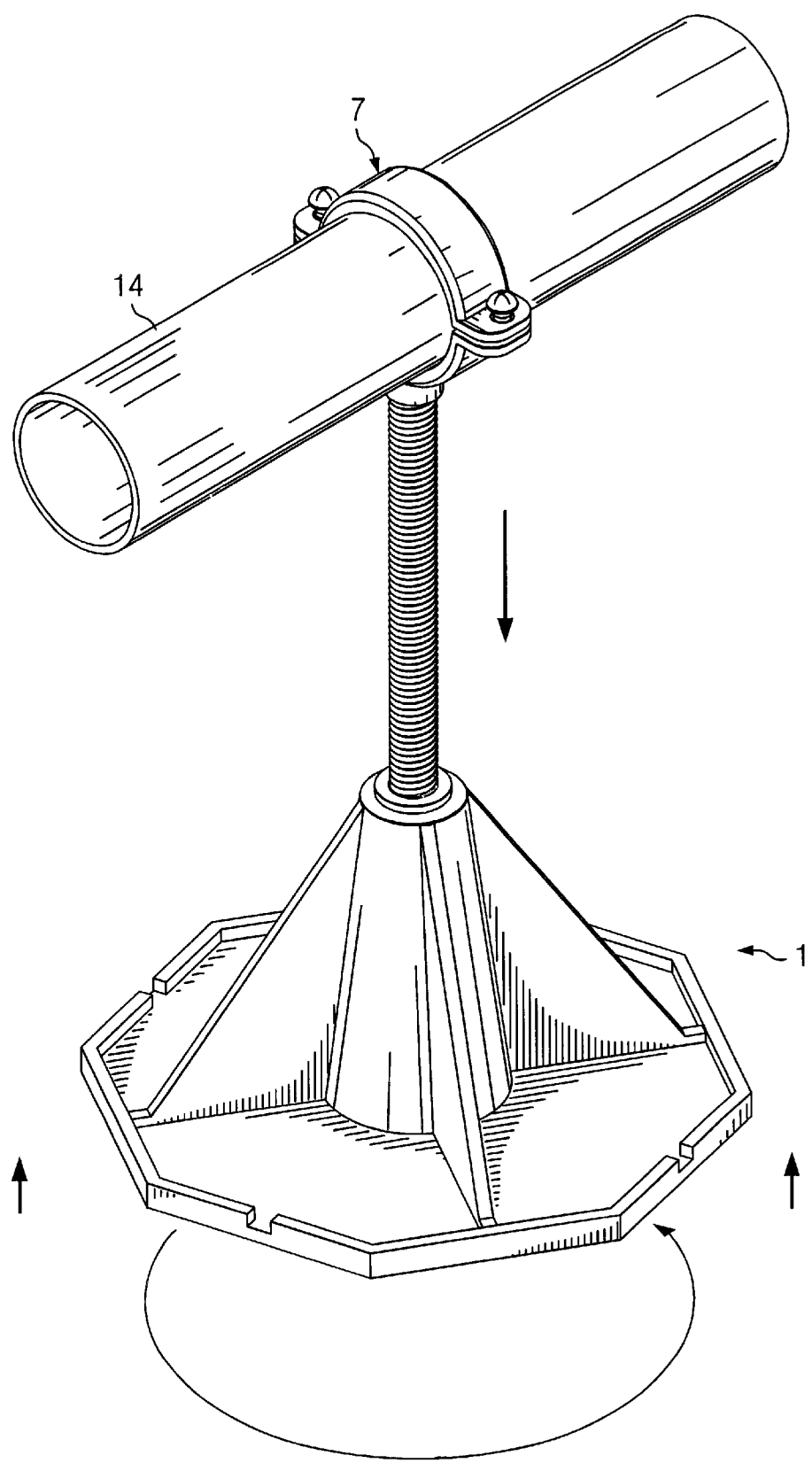
FIG. 5 is a demonstration of vertical height adjustment.

FIG. 5 demonstrates how the completed assembly gains vertical height by the turning either clockwise or counter clockwise of the base. The reader can see how an installer can hold with one hand pipe clamp 7, elevating the entire base assembly with piping 14 intact slightly above the roof, and by turning or spinning base 1, the support is raised or lowered. Because the base can turn freely above the roof, height adjustments are simple.

Figure 6:
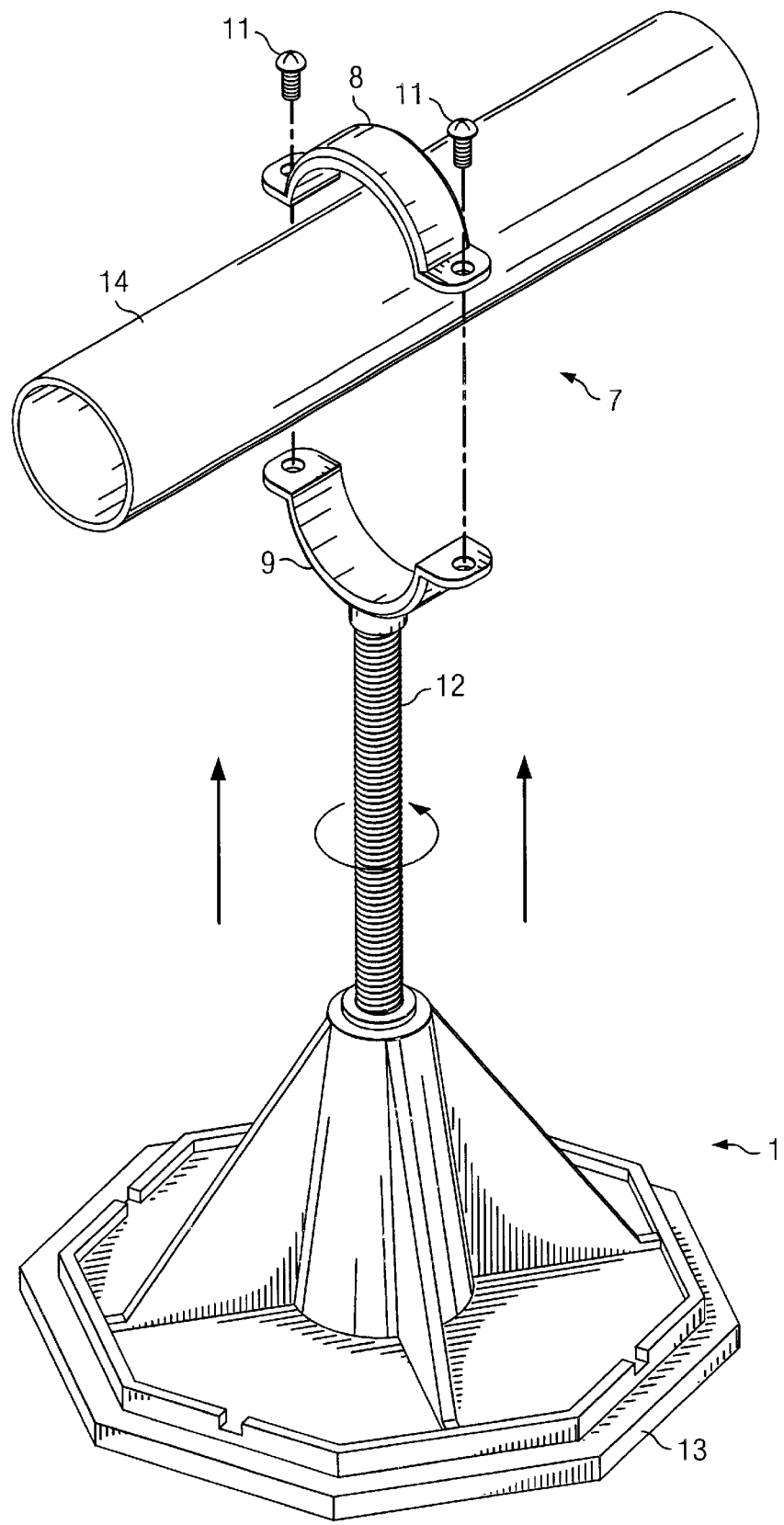
FIG. 6 is the alternate technique of height adjustment.

FIG. 6 shows base 1 as held rigid whiles the pipe clamp 7 with adjustment rod 12 are turned. In this technique, piping 14 is not secured to clamp 7. Upper portion 8 is lifted from lower portion 9 and the piping by the removal of screws 11. In this view cushion pad 13 is shown at the bottom of the base. This pad assists in preventing damage caused by unintentional movement of the pipe assembly.

CONCLUSIONS, RAMIFICATIONS, AND SCOPE OF THE INVENTION

Thus the reader will see that the invented single post support provides a practical method to both secure and support a piping system while permitting vertical adjustment to the height of the system.

Although the description contains many specifications, these should not be construed as limiting the scope of the invention but as merely providing illustrations of the presently preferred embodiment of the invention. The many uses of the invention should not be limited by the example of use here in described. Thus the scope of the invention should be determined by the appended claims and their legal equivalents, rather than by the example given.

I claim:

1. A single post adjustable support device to support a piping system on a roof comprising:

a support base comprising;

a flat lower member having a top surface and a bottom surface, an elongated truncated cone of a selected length and having a base and a top portion, said base integrally formed with and extending perpendicular from said top surface of said flat lower member, said truncated cone further defining an aperture extending through said truncated cone from said top portion to said base, and a plurality of reinforcement flanges integrally formed with said flat lower member and said truncated cone and extending between said top surface of said flat lower member and said elongated truncated cone;

a resilient pad attached to said bottom surface of said flat lower member;

a clamp adapted to be fixedly secured around a pipe and having a top portion and a bottom portion;

a single adjusting apparatus comprising;

a single elongated threaded rod having a length substantially equal to said selected length of said elongated cone, and said threads extending between a first end and a second end, said first end attached to said bottom portion of said clamp; and a threaded insert for receiving said threads of said elongated threaded rod, said threaded insert fixedly secured in said aperture at said top portion of said elongated truncated cone such that rotation between said elongated rod and said threaded insert changes the distance between said clamp and said support base, so that such said distance between said clamp and said support base can be changed while said clamp is fixedly secured around said pipe.

2. The adjustable support device of claim 1 wherein said resilient pad is made of neoprene.

3. The adjustable support device of claim 1 wherein said top and bottom portions of said clamp are formed of metal and further comprising at least one fastening device for joining said top and bottom portions of said clamp.

4. The adjustable support device of claim 3 wherein said top and bottom portions of said clamp are made of stainless steel.

5. The adjustable support device of claim 3 further comprising a resilient member located between said clamp and said pipe.

6. The adjustable support device of claim 5 wherein said resilient member is made of neoprene.

7. The adjustable support device of claim 1 wherein said integrally formed support base is made by injection molded plastic.

8. The adjustable support device of claim 1 wherein said elongated rod is made of stainless steel.

* * * * *